US008983859B2

(12) United States Patent
Nice et al.

(10) Patent No.: US 8,983,859 B2
(45) Date of Patent: Mar. 17, 2015

(54) USER CENTRIC REAL-TIME ADVERTISEMENT BIDDING

(75) Inventors: Nir Nice, Kfar Veradim (IL); Uri Barash, Tel Mond (IL); Ying Li, Bellevue, WA (US); Michael J. Goldbach, Albany, CA (US); William H. Gates, III, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 663 days.

(21) Appl. No.: 12/818,397

(22) Filed: Jun. 18, 2010

(65) Prior Publication Data

US 2011/0313857 A1      Dec. 22, 2011

(51) Int. Cl.
*G06Q 30/00*      (2012.01)
*G06Q 30/02*      (2012.01)

(52) U.S. Cl.
CPC ............ *G06Q 30/02* (2013.01); *G06Q 30/0255* (2013.01); *G06Q 30/0269* (2013.01); *G06Q 30/0275* (2013.01)
USPC ................... 705/14.71; 705/14.53; 705/14.66

(58) Field of Classification Search
CPC . G06Q 40/00–40/06; G06Q 30/0241–30/0277
USPC ............................ 705/14.71, 14.42, 14.43, 37
See application file for complete search history.

(56) References Cited

U.S. PATENT DOCUMENTS

| | | | | |
|---|---|---|---|---|
| 5,794,210 A | * | 8/1998 | Goldhaber et al. | 705/14.69 |
| 5,855,008 A | * | 12/1998 | Goldhaber et al. | 705/14.1 |
| 6,285,987 B1 | * | 9/2001 | Roth et al. | 705/14.71 |
| 6,324,519 B1 | * | 11/2001 | Eldering | 705/14.66 |
| 7,680,786 B2 | | 3/2010 | Koran | |
| 7,831,479 B2 | * | 11/2010 | Scargill et al. | 705/26.3 |
| 7,949,562 B2 | * | 5/2011 | Collins | 705/14.43 |
| 8,380,608 B2 | * | 2/2013 | Stevens | 705/37 |
| 2001/0054001 A1 | * | 12/2001 | Robinson | 705/14 |
| 2001/0056396 A1 | * | 12/2001 | Goino | 705/37 |

(Continued)

FOREIGN PATENT DOCUMENTS

| CN | 101611420 | 12/2009 |
|---|---|---|
| JP | 2008-257728 | 10/2008 |

(Continued)

OTHER PUBLICATIONS

Understanding the Real-Time Bidding (RTB) from the publisher perspective—Retrieved Date: Apr. 13, 2010 http://www.pubmatic.com/wp-content/uploads/2010/02/PubMatic_RTB_White_Paper.pdf.

(Continued)

*Primary Examiner* — Bennett Sigmond
(74) *Attorney, Agent, or Firm* — Joann Dewey; Doug Barker; Micky Minhas (57) ABSTRACT

A client-based ad agent dynamically determines whether an advertisement campaign should bid on an impression for an end user and/or sets the bid price of the advertisement campaign for the impression. When an opportunity for an impression on a web page is identified, the ad agent accesses user data associated with an end user. The ad agent analyzes the user data to identify the relevance and/or value of serving an impression to the end user to the advertisement campaign. Based on the analysis, the ad agent controls whether the advertisement campaign bids on the impression for the end user and/or sets the bid price of the advertisement campaign for the impression.

20 Claims, 5 Drawing Sheets

(56) References Cited

U.S. PATENT DOCUMENTS

| | | | |
|---|---|---|---|
| 2002/0077959 A1* | 6/2002 | Alaia et al. | 705/37 |
| 2002/0111894 A1* | 8/2002 | Stevens | 705/37 |
| 2006/0026064 A1* | 2/2006 | Collins | 705/14 |
| 2006/0074749 A1* | 4/2006 | Kline et al. | 705/14 |
| 2006/0074769 A1* | 4/2006 | Looney et al. | 705/26 |
| 2006/0212350 A1 | 9/2006 | Ellis | |
| 2006/0248110 A1* | 11/2006 | Lynn et al. | 707/102 |
| 2007/0005421 A1* | 1/2007 | Labio et al. | 705/14 |
| 2007/0043646 A1* | 2/2007 | Morris | 705/37 |
| 2007/0208630 A1* | 9/2007 | Chatter et al. | 705/26 |
| 2007/0288953 A1* | 12/2007 | Sheeman et al. | 725/34 |
| 2008/0021792 A1* | 1/2008 | Steelberg et al. | 705/26 |
| 2008/0109376 A1 | 5/2008 | Walsh | |
| 2008/0162329 A1* | 7/2008 | Knapp et al. | 705/37 |
| 2008/0167948 A1* | 7/2008 | Park | 705/10 |
| 2008/0183757 A1 | 7/2008 | Dorogusker | |
| 2008/0189169 A1* | 8/2008 | Turpin et al. | 705/10 |
| 2008/0201188 A1* | 8/2008 | Heyman et al. | 705/7 |
| 2008/0228656 A1* | 9/2008 | Soni | 705/80 |
| 2008/0275899 A1 | 11/2008 | Baluja | |
| 2009/0063284 A1* | 3/2009 | Turpin et al. | 705/14 |
| 2009/0076890 A1* | 3/2009 | Dixon et al. | 705/10 |
| 2009/0089144 A1* | 4/2009 | Hodge, Jr. | 705/10 |
| 2009/0112701 A1* | 4/2009 | Turpin et al. | 705/10 |
| 2009/0216642 A1* | 8/2009 | Ho et al. | 705/14 |
| 2009/0234706 A1 | 9/2009 | Adams | |
| 2009/0248478 A1* | 10/2009 | Duggal et al. | 705/8 |
| 2009/0259550 A1* | 10/2009 | Mihelich et al. | 705/14.42 |
| 2009/0265243 A1* | 10/2009 | Karassner et al. | 705/14.54 |
| 2009/0271228 A1 | 10/2009 | Bilenko | |
| 2009/0313120 A1* | 12/2009 | Ketchum | 705/14.51 |
| 2009/0327030 A1 | 12/2009 | Collins | |
| 2010/0145809 A1* | 6/2010 | Knapp et al. | 705/14.71 |
| 2010/0241511 A1* | 9/2010 | Cunningham et al. | 705/14.46 |
| 2010/0262498 A1* | 10/2010 | Nolet et al. | 705/14.71 |
| 2010/0268603 A1* | 10/2010 | Nolet et al. | 705/14.53 |
| 2010/0268609 A1* | 10/2010 | Nolet et al. | 705/14.71 |
| 2011/0060646 A1* | 3/2011 | Park | 705/14.46 |
| 2011/0238486 A1* | 9/2011 | Liu et al. | 705/14.42 |

FOREIGN PATENT DOCUMENTS

| | | |
|---|---|---|
| KR | 10-2008-0004711 | 1/2008 |
| KR | 10-2009-0000080 | 1/2009 |

OTHER PUBLICATIONS

International Search Report and Written Opinion of PCT/US2011/039078, mailed Feb. 28, 2012.

European Search Report in PCT/US2011039078, mailed Apr. 4, 2014.

* cited by examiner

USER CENTRIC REAL-TIME ADVERTISEMENT BIDDING

BACKGROUND

Advertising is an established way for merchants to reach an audience of potential customers. Ideally, merchants desire to have their advertisements directed to individuals that are likely to purchase the merchants' products and services. Accordingly, advertising has gone through an evolution of targeting approaches. Initially, advertising was often generally untargeted. However, over time, merchants began to target potential customers in a number of ways. For instance, merchants often target a particular audience by selectively choosing the medium (e.g., newspapers, magazines, radio, television, etc.) in which to advertise. Additionally, advertising is often targeted by selecting the particular context (e.g., specific shows on television, specific web pages on the Internet, etc.) within which the advertisements will appear.

Online advertising has become a significant aspect of computing environments, as it presents a powerful way for advertisers to market their products and services. For instance, online advertising is often more likely to allow advertisers to effectively deliver advertisements to their target audiences as compared with traditional media advertising, such as newspapers, magazines, and radio. Additionally, there are a variety of advertising systems and methods for delivering online advertisements for presentation to users.

One form of online advertising includes presenting an advertisement within an electronic document, such as a web page, served by a content server to a user device. The web page may include an area for presenting an advertisement. When an end user requests a web page from a content server, an advertising delivery system may select an advertisement for presentation within the area provided by the web page. Each presentation of an advertisement within a web page is referred to as an impression.

Advertising delivery systems often select advertisements for delivery and presentation within a web page using an auction process. In particular, advertisers establish advertisement campaigns on the advertising delivery system. Each advertisement campaign includes an advertisement that may be delivered for presentation on web pages and bid price settings that are used for advertisement selection purposes. The bid price settings may reflect one or more payment models. For instance, the bid price settings may comprise a cost-per-impression price that reflects an amount an advertiser is willing to pay for presentation of an advertisement. As another example, the bid price settings may comprise a cost-per-performance price that reflects an amount the advertiser is willing to pay for performance of some action by the end user (e.g., clicking on the advertisement or purchasing the advertiser's product or service). The auction process comprises comparing bid prices associated with competing advertisement campaigns and selecting the advertisement campaign having the highest bid price and/or the advertisement campaign determined likely to generate the highest advertising revenue for that impression. Other approaches for selecting advertisements (e.g., priority-based) for a given impression may also be employed by advertising delivery systems.

As noted above, bidding on impressions is typically done based on advertisement campaign pre-settings. In other words, the bid price settings associated with advertisement campaigns are fixed by the advertiser when the advertisement campaign is established. As can be expected, this provides a particularly rigid approach to targeting advertisements to end users. In some instances, some flexibility may be provided by configuring an advertisement campaign to target specific types of users. For instance, an advertisement campaign may be configured to only bid for impressions for end users that have previously visited a particular website. However, this approach still limits the ability to dynamically add and/or remove specific users from a particular advertisement campaign. Additionally, it does not enable the advertiser to vary the bid price of particular advertisement campaigns for specific users. Some additional bidding approaches are currently available that allow differential bidding based on impression characteristics but are typically limited in capabilities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a client-based ad agent that facilitates determining whether an advertisement campaign should bid on a given impression and/or setting the bid price an advertisement campaign should bid for a given impression. The ad agent is triggered when an end user accesses a web page on which an advertisement is to be presented. When triggered, the ad agent accesses user data regarding the end user and analyzes the user data and, in some instances, additional information to determine whether the advertisement campaign should bid on the current impression and/or to determine the bid price the advertisement campaign should bid on the current impression. Based on the analysis, the ad agent may communicate with an advertisement server that operates to select an advertisement for the current impression. The ad agent may facilitate tagging the advertisement campaign to control whether the advertisement campaign bids on the current impression and/or to set the bid price of the advertisement campaign for the current impression.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide a client-based ad agent that dynamically controls whether an advertisement campaign bids on impressions and/or sets the price the advertisement campaign bids on different impressions. Because the ad agent is a client-based component, embodiments of the present invention may operate with existing advertisement servers and publisher websites without the need to modify the advertisement servers and/or the publisher websites.

In accordance with embodiments of the present invention, an entity establishes an advertisement campaign on an advertisement server that may compete with other advertisement campaigns for impressions. Additionally, the entity may provide a client-based ad agent to end users for installation on user devices.

When an end user accesses a web page that provides an opportunity for an impression, the ad agent is triggered. The ad agent accesses user data that is useful for determining whether an end user is valuable for the advertisement campaign. In some embodiments, the ad agent analyzes the user data to determine whether the advertisement campaign should bid on the current impression for the end user. If the ad agent determines that the end user is relevant and valuable to the advertisement campaign, the ad agent tags the advertisement campaign to bid on the current impression. In some embodiments, in addition to tagging the advertisement campaign to bid on the current impression, the ad agent may set the price for the advertisement campaign to bid on the current impression. Alternatively, if the ad agent determines that the end user is not relevant to the advertisement campaign, the ad agent will not tag the advertisement campaign to bid on the current impression. As such, the advertisement campaign will bid on the impression only if the ad agent determines that serving an impression to the end user presents sufficient value to the advertisement campaign.

In other embodiments, instead of making a threshold determination regarding whether the advertisement campaign should bid on the current impression, the ad agent may calculate a bid value for the end user for the impression. The ad agent will then set the bid price of the advertisement campaign corresponding with the calculated bid value. Accordingly, the bid price of the advertisement campaign reflects the value to the advertisement campaign of serving an impression to the end user.

In some instances, an advertisement server may not support dynamic bid price tagging for advertisement campaigns. Accordingly, some embodiments provide varying bid prices by using multiple advertisement campaigns for a particular advertisement. In particular, an entity may establish multiple advertisement campaigns with different bid prices. When the ad agent is triggered, the ad agent determines the bid value of the end user and compares the bid value against the different bid prices. An advertisement campaign having a bid price corresponding to the end user's bid value is selected, and the ad agent tags the selected advertisement campaign. As such, the selected advertisement campaign bids on the current impression while the other advertisement campaigns do not.

Accordingly, in one aspect, an embodiment of the present invention is directed to one or more computer storage media storing computer-useable instructions that, when used by a computing device, cause the computing device to perform a method. The method includes identifying, at a client device, an opportunity for an advertisement impression. The method also includes accessing user data associated with an end user and analyzing the user data to determine whether to instruct an advertisement campaign to bid on the advertisement impression. The method further includes determining to instruct the advertisement campaign to bid on the advertisement impression based on the user data. The method still further includes communicating, from the client device, an instruction for the advertisement campaign to bid on the advertisement impression.

In another embodiment, an aspect of the invention is directed to one or more computer storage media storing a client-based ad agent, the ad agent including a plurality of components, including a user data accessing component, a bid decision component, and a tagging component. The user data accessing component accesses user data associated with an end user in response to identifying an opportunity for an advertisement impression. The bid decision component determines a bid value for the end user for the advertisement impression based on the user data. The tagging component communicates to an advertisement server an instruction to set a bid price for an advertisement campaign to bid for the advertisement impression corresponding with the bid value.

A further embodiment is directed to one or more computer storage media storing computer-useable instructions that, when used by a computing device, cause the computing device to perform a method. The method includes identifying, at a client device, an opportunity for an advertisement impression and accessing user data associated with an end user. The method also includes calculating a bid value for the end user for the advertisement impression based on the user data and comparing the bid value to bid prices associated with a plurality of advertisement campaigns. The method further includes selecting, from the plurality of advertisement campaigns, an advertisement campaign based on the bid value and a bid price associated with the advertisement campaign. The method further includes communicating, from the client device, an instruction for the advertisement campaign to bid on the advertisement impression.

Figure 1:
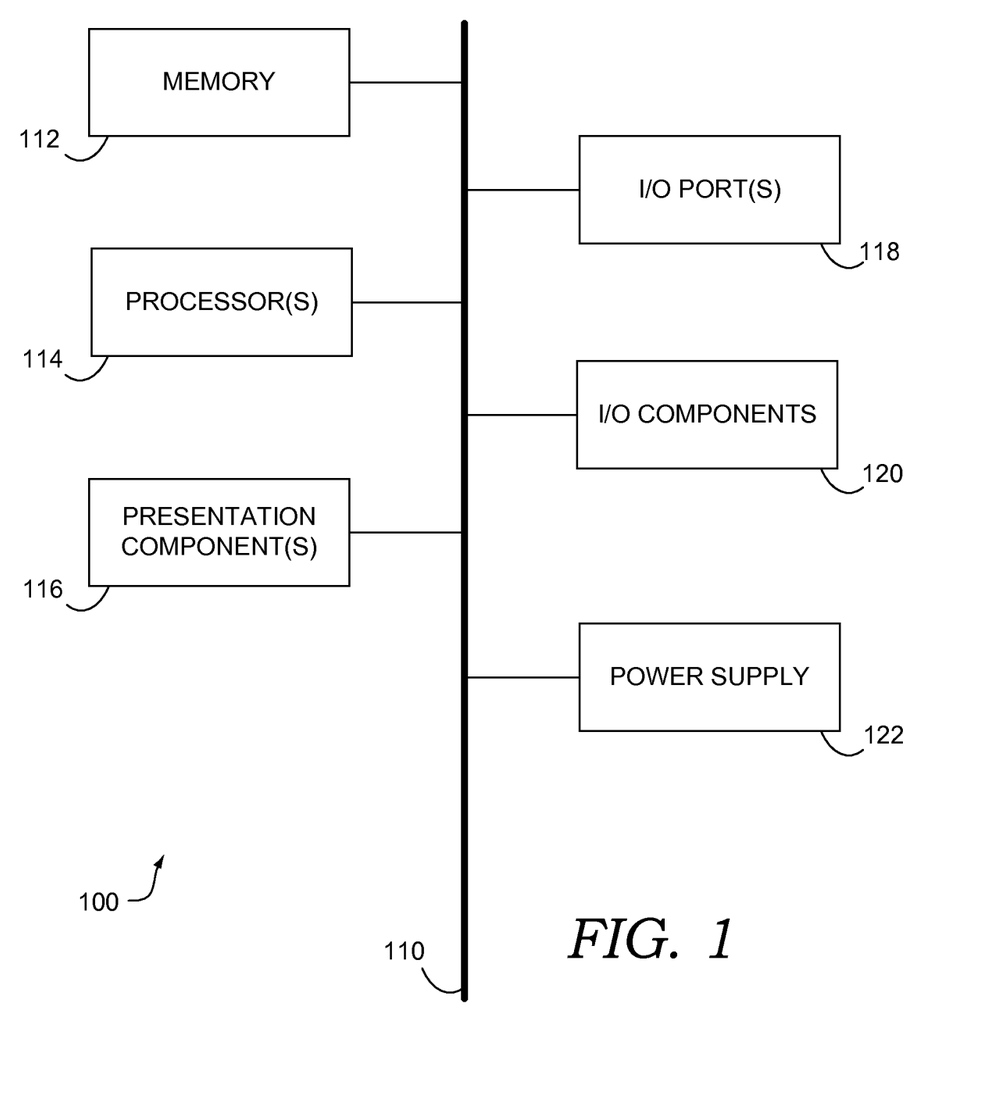
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
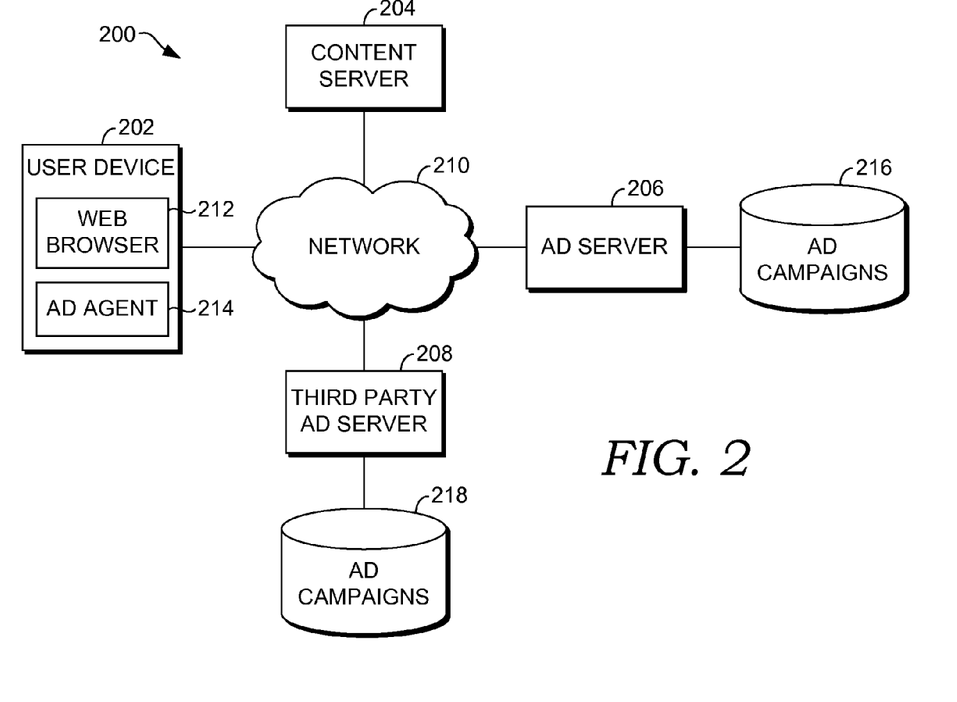
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a content server 204, an advertisement server 206, and a third party advertisement server 208. Each of the components shown in FIG. 2 may be any type of computing device, such as computing device 100 described with reference to FIG. 1, for example. The components may communicate with each other via a network 210, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and advertisement servers may be employed within the system 200 within the scope of the present invention. Each may comprise a single device or multiple devices cooperating in a distributed environment. For instance, the advertisement server 206 may comprise multiple devices arranged in a distributed environment that collectively provide the functionality of the advertisement server 206 described herein. Additionally, other components not shown may also be included within the system 200, while components shown in FIG. 2 may be omitted in some embodiments.

The user device 202 may be any type of computing device owned and/or operated by an end user that can access network 210. For instance, the user device 202 may be a desktop computer, a laptop computer, a tablet computer, a mobile device, or any other device having network access. Generally, an end user may employ the user device 202 to, among other things, access electronic documents maintained by content servers, such as the content server 204. For instance, the end user may employ a web browser 212 on the user device 202 to access and view electronic documents from the content server 204.

The content server 204 may be any type of server device capable of hosting electronic documents from a publisher and serving the electronic documents to computing devices such as the user device 202. For instance, the content server 204 may be a server maintaining web pages for a publisher website. Space may be provided on the web pages for presenting advertisements. In particular, when an end user accesses a web page from the content server 204, the advertisement server 206 may select and deliver an advertisement for presentation within the web page.

In some embodiments, the content server 204 and advertisement server 206 may be provided by separate entities. In other embodiments, the content server 204 and advertisement server 206 may be provided by a common entity. For example, the content server 204 may be a server that provides web pages associated with the website, www.abcnews.com, provided by the ABC News service. Additionally, the advertisement server 206 may be maintained by the ABC News service to deliver advertisements for presentation on web pages from its website.

A number of advertisement campaigns are maintained within advertisement campaign storage 216 associated with the advertisement server 206. In some instances, advertisement campaigns may be submitted by advertisers and each includes an advertisement and bid price settings. In other instances, advertisement campaigns may be submitted by third party advertising delivery system providers, such as a third party advertising delivery system provider associated with the third party advertisement server 208. To illustrate using the example above in which the content server 204 serves the ABC News website and the advertisement server 206 is provided by the ABC News service, the ABC News service may sell advertising space on its website directly to advertisers. In this instance, the advertisers submit their advertisement campaigns for inclusion in the advertisement campaign storage 216. Additionally, the ABC News service may allow a third party advertising delivery system provider to submit advertisement campaigns that may compete against the advertisers' campaigns. The advertisement campaign submitted by the third party advertising system provider may simply include bid price settings and a redirect to the third party advertisement server 208.

If an advertiser's advertisement campaign is selected for a given impression, the advertisement server 206 may deliver a corresponding advertisement from the advertisement campaign storage 216. Alternatively, if a third party advertising system provider's advertisement campaign is selected for a given impression, a redirect to the third party advertisement server 208 may be provided, and the third party advertisement server 208 may deliver an advertisement from the advertisement campaign storage 218 associated with the third party advertisement server 208.

Figure 3:
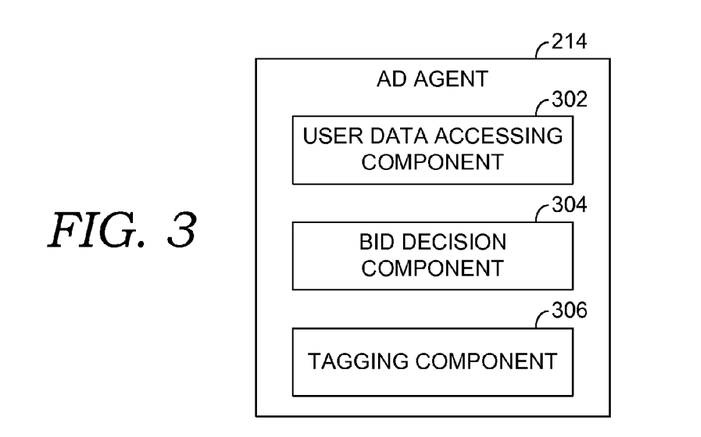
FIG. 3 is a block diagram of an exemplary ad agent in accordance with an embodiment of the present invention.

In accordance with embodiments of the present invention, the user device 202 includes an ad agent 214 that provides dynamic, real-time decision making to determine whether an advertisement campaign should bid on a given impression. As shown in FIG. 3, the ad agent 214 may include a user data accessing component 302, a bid decision component 304, and a tagging component 306. In some embodiments, the ad agent 214 comprises a browser plug-in that adds capabilities described herein to the web browser 212 on the user device 202.

The ad agent 214 may be triggered to dynamically determine whether to bid on a given impression in a number of different ways. In some embodiments, the ad agent 214 may be triggered when the user device 202 accesses a web page from the content server 204 that includes a redirect to the advertisement server 206. In particular, the ad agent 214 may be triggered by the presence of the redirect in the web page. In other embodiments, the ad agent 214 may be triggered when a web page is requested from the content server 204. For instance, the ad agent 214 may be triggered by recognizing the domain of the requested web page.

When the ad agent 214 is triggered, the user data accessing component 302 accesses user data that will be used to determine whether to bid on the current impression. The user data may comprise a variety of different information regarding the end user employing the user device 202 that facilitates determining the relevance and/or value of the end user for an impression. By way of example only and not limitation, the user data may include data regarding the end user's web browsing history, including what web pages the user has visited and at what point in time each web page was visited. The user data may also include information regarding web searches performed by the end user, including search queries submitted by the end user and search results selected by the end user in response to the search queries. The user data may further include information regarding the end user's spending habits, including what types of products and services the end user purchases and the price level of the purchases (e.g., inexpensive, expensive, full price, discounted price, etc.). As a further example, the user data may include information regarding advertisements delivered to the end user, such as information regarding the type and number of advertisements delivered to the end user over a period of time (e.g., the advertisements the end user has seen today), and the end user's interaction with the advertisements. As still yet another example, the user data may include other information from the end user's computer activities, such as session length or information from the end user's email. A variety of additional user data may be collected and employed within embodiments of the present invention.

The user data may be stored in a user profile that is continuously updated. In some embodiments, user data may be tracked and stored on the user device 202. For instance, the ad agent 214 may include a component for tracking the end user's computer activities to identify and store user data that may be used for bid decision purposes. The user data may be stored in a user profile maintained on the user device 202. In other embodiments, the user data may be tracked by a server device. For instance, user data may be accessed from a user centric data platform and/or a user personal data store or data manager that operates to manage user data for the end user in the network cloud. In such embodiments, the user data may be either periodically provided to the user device 202 using a push or pull approach or may be pulled by the user device 202 when the ad agent 214 is triggered. In still further embodiments, user data may be tracked by both the user device 202 and a server device, and the collection of data may be employed by the ad agent 214 for bid decision purposes. Any and all such variations are contemplated to be within the scope of embodiments of the present invention.

User data accessed by the user data accessing component 302 is employed by the bid decision component 304 to determine whether an advertisement campaign should bid on the current impression and/or to set the bid price for the current impression. The determination approximates the value of the end user and the current impression to the advertisement campaign. For instance, this may comprise an estimation of whether the end user will be affected by the current impression in a manner that results, for example, in the user selecting the impression to view a landing page and/or ultimately purchasing the associated product or service.

In some embodiments, the bid decision component 304 determines whether to bid on the current impression by evaluating the user data. This may include calculating a score based on the user data and determining whether the score exceeds a predetermined threshold. If the score exceeds the threshold, the bid decision component 304 determines to bid on the current impression. Alternatively, if the score does not exceed the threshold, the bid decision component 304 determines not to bid on the current impression. In one embodiment, this may include calculating a monetary bid value for the end user and the given impression based on the user data and comparing the bid value against a bid price associated with the advertisement campaign. For instance, suppose that the bid price for a given advertisement campaign is $0.50. If the bid decision component 304 determines that the bid value for the end user for the current impression is greater than $0.50 (e.g., $0.65), the end user is viewed as being valuable to the advertisement campaign and the bid decision component 304 will determine that the advertisement campaign should bid on the current impression. However, if the bid decision component 304 determines that the bid value for the end user for the current impression is less than $0.50 (e.g., $0.35), the end user is not deemed to be sufficiently valuable to the advertisement campaign and the bid decision component 304 will determine that the advertisement campaign should not bid on the current impression.

In other embodiments, the bid decision component 304 may not make a threshold determination whether an advertisement campaign should bid on the current impression. Instead, the bid decision component 304 may simply determine the bid value of the end user for the current impression. The bid value determined by the bid decision component 304 may then communicated to the advertisement server 206 and employed as the bid price for the advertisement campaign for the current impression. Such embodiments rely upon the use of an advertisement server that supports dynamic pricing for advertisement campaigns.

If the advertisement server 206 does not support dynamic pricing for advertisement campaigns, dynamic pricing may be provided in some embodiments using multiple coordinated advertisement campaigns. In particular, multiple campaigns may be created on the advertisement server 206 that are associated with a given advertisement but include different bid prices. The bid decision component 304 has knowledge of the bid price for each campaign. Using that knowledge and the bid value calculated for the end user for the current impression, the bid decision component 304 may select a particular advertisement campaign that should participate in bidding on the current impression. For instance, suppose that three coordinated advertisement campaigns are established with the following bid prices: $0.25, $0.50, and $0.75. Suppose further that the bid decision component 304 determines the bid value for the end user for the current impression is $0.60. Based on this bid value, the bid decision component 304 would select the advertisement campaign with the bid price of $0.50 since the bid value of the end user for the current impression exceeds that bid price but does not exceed the next highest bid price (i.e., $0.75).

Determining whether to bid on a given impression and/or what bid price to set for a given impression may be based on user data alone in some embodiments. In other embodiments, the determination may be based on additional data. For instance, the determination may be based on knowledge of the advertisement campaign. One example of this approach was provided above in which the bid decision component 304 has knowledge of the bid prices associated with various advertisement campaigns such that one advertisement campaign may be selected based on the bid value of the end user for the current impression. Another example includes evaluating the user data with knowledge of the content of an advertisement campaign. If an advertisement campaign is directed to a given product or service, an end user who would be likely to purchase that product or service would have a greater value. For example, suppose that an advertisement campaign is directed to basketball sneakers. An end user who plays basketball or has children who play basketball, as evidenced by the user data associated with the end user, would have a higher value than an end user who has no interest in basketball. In further embodiments, the advertisement server 206 may provide information about campaign budgets and objectives (e.g., target cost per action or cost per click, or maximum cost per thousand impressions) and/or information about auction dynamics (e.g., win rate data) that may allow the bid decision component 304 to make intelligent decisions about bidding and bid pricing.

The content or type of the web page requested by the end user in which the advertisement will be placed may also be a factor in determining whether to bid on a given impression and/or the bid price to set for a given impression. For instance, the user data associated with a given end user may indicate that an end user is not likely to select an advertisement and/or make a purchase for advertisements presented on particular types of web pages, while the end user is more likely to select an advertisement and/or make a purchase for advertisements presented on other types of web pages. Such information could be used to determine whether an advertisement campaign should submit a bid and/or the bid price for a given impression.

In further embodiments of the present invention, the bid decision component 304 may receive a determination whether to bid on the current impression and/or a bid price from a server device. In other words, the bid decision 304 may not include the intelligence to determine whether an advertisement campaign should bid on a given impression and/or the bid price. Instead, a server device includes such intelligence, and the bid decision component 304 communicates with the server device to access such information upon page view. For instance, user data may be provided (periodically and/or at runtime when an advertisement is to be presented) from the user device 202 to a server device. In an embodiment, the user data accessing component 302 may provide user data collected on the user device 202 to the server device. The server device employs the user data to determine whether the advertisement campaign should bid on the current impression and/or the bid price for the current impression. The server device then communicates information regarding that determination to the bid decision component 304.

Based on the determination made by the bid decision component 304, the tagging component 306 facilitates controlling whether an advertisement campaign bids on a given impression and/or what price the advertisement campaign bids on the given impression. In some instances, the tagging component 306 may simply instruct an advertisement campaign whether to bid on a given impression. In other instances, the advertisement server 206 may support tagging with extended data. For instance, the advertisement server 206 may support dynamic price tagging. In such instances, the tagging component 306 may set the bid price of the advertisement campaign for the current impression by communicating the bid price to the advertisement server 206. If the advertisement server 206 cannot accept such extended data, the tagging component 306 may select an appropriate tag to fire as opposed to dynamically inserting a value into a tag. In some embodiments, the tagging component 306 may set an expiration time for the data sent to the advertisement server 206.

The tagging component 306 may tag an advertisement campaign for a given impression in a number of different manners in accordance with various embodiments of the present invention. As used herein, "tagging" an advertisement campaign generally refers to providing information to the advertisement server 206 about the user's qualification for the advertisement campaign to control whether the advertisement campaign will be considered by the advertisement server 206 for the current impression and/or the bid price of the advertisement campaign for the current impression. By way of example only and not limitation, in one embodiment, the tagging component 306 fires code that sends an http request to the advertisement server 206 that provides information regarding the user's qualification for the advertisement campaign. In another embodiment, the tagging component 306 may generate a cookie that controls whether an advertisement campaign bids on a particular impression and/or the bid price for the impression. For instance, the advertisement campaign bid price settings may specify that the advertisement campaign's bid price is valid only if the presence of a particular cookie is identified. As such, if the bid decision component 304 determines that the advertisement campaign should bid on the current impression, the tagging component 306 generates an appropriate cookie. Alternatively, if the bid decision component 304 determines that the advertisement campaign should not bid on the current impression, the tagging component 306 does not generate a cookie. The presence or absence of the cookie then controls whether the advertisement campaign bids on a given impression based on the advertisement campaign's bid price settings.

In some embodiments, the advertisement server 206 may support dynamically specifying a bid price for an advertisement campaign. In such embodiments, the bid decision component 304 may determine a bid value for the end user for the current impression. Based on the bid value, the tagging component 306 may communicate the bid value to the advertisement server 206 as the bid price to be set for the advertisement campaign. The advertisement server 206 may receive the information and determine the bid price for the advertisement campaign.

The process of determining whether to bid on an impression for an end user and tagging the advertisement campaign for the end user may introduce some latency in the delivery of an advertisement. As such, some embodiments reduce latency by tagging the advertisement campaign after an advertisement has been provided for the current impression. This provides that the end user's participation in the advertisement campaign will only be affected by the ad agent 214 on the next impression and not the current impression, which may be acceptable in some instances. For example, when a user first accesses a particular website or web page hosted by the content server 204, an auction process or other advertisement selection process may be conducted by the advertisement server 206 without being affected by the ad agent 214. However, the ad agent 214 may determine the appropriate tagging for the advertisement campaign in response to that first visit to the website or web page. As such, when the user subsequently visits the website or web page, the advertisement campaign may be tagged by the ad agent 214 for the particular user and may participate in the advertisement selection process for that subsequent impression accordingly. This approach reduces latency in advertisement delivery introduced by operation of the ad agent 214.

Figure 4:
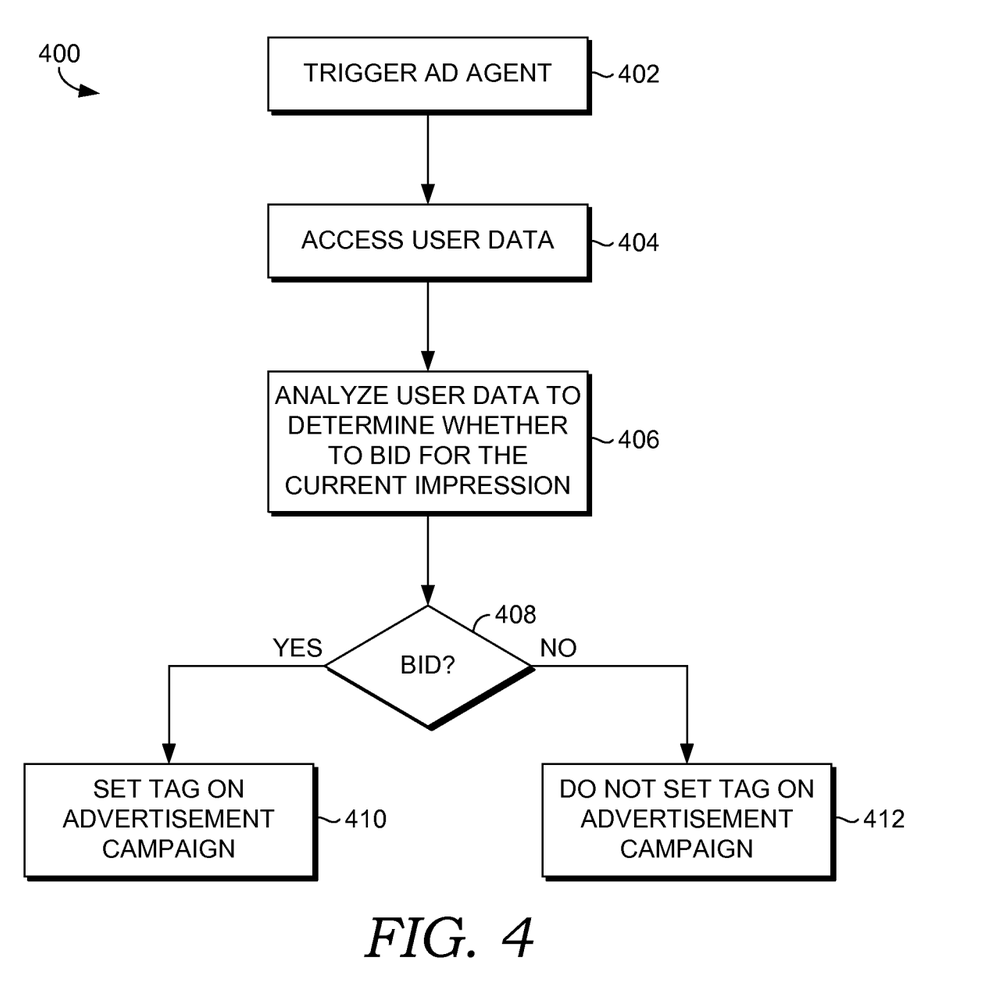
FIG. 4 is a flow diagram showing a method for employing a client-based ad agent to control whether an advertisement campaign bids on a given impression in accordance with an embodiment of the present invention.

Turning to FIG. 4, a flow diagram is provided that illustrates a method 400 for employing a client-based ad agent to control whether an advertisement campaign bids on a given impression in accordance with an embodiment of the present invention. As shown at block 402, an ad agent located on an end user's computing device is initially triggered. As noted above, the ad agent may be triggered in a number of different manners. For instance, the ad agent may be triggered when a web page is accessed that includes a redirect to an advertisement server. In other instances, the ad agent may be triggered based on the domain of a web page requested by the end user.

User data is accessed at block 404. The user data may include any of a variety of information that is useful in determining whether an advertisement campaign should bid on the current impression. By way of example only and not limitation, the user day may include the end user's web browsing history, web search history, spending habits, and other computing activities. The user data may be stored and accessed from the end user's computing device and/or from a remote server.

The user data is analyzed to determine whether the advertisement campaign should bid on the current impression, as shown at block 406. As discussed above, the user data may be analyzed in isolation or may be analyzed in conjunction with additional data, such as knowledge of aspects of the advertisement campaign or the content/type of the web page in which the advertisement will be presented. In some embodiments, the analysis may include calculating a score based on the user and comparing the score to a predetermined threshold. The score may comprise a bid value for the end user and the current impression, and the bid value may be compared against a bid price for the advertisement campaign to determine whether the advertisement campaign should bid on the current impression.

Based on the analysis at block 406, a determination is made at block 408 regarding whether the advertisement campaign should bid on the current impression. If it is determined that the advertisement campaign should bid on the current impression, the ad agent sets a tag on the advertisement campaign such that the advertisement campaign will bid on the current impression, as shown at block 410. Alternatively, if it is determined that the advertisement campaign should not bid on the current impression, the ad agent will not set a tag on the advertisement campaign such that the advertisement campaign will not bid on the current impression, as shown at block 412. In some instances, the advertisement campaign may have been previously tagged to include the end user and the process at block 412 may include un-tagging the advertisement campaign for the end user.

Figure 5:
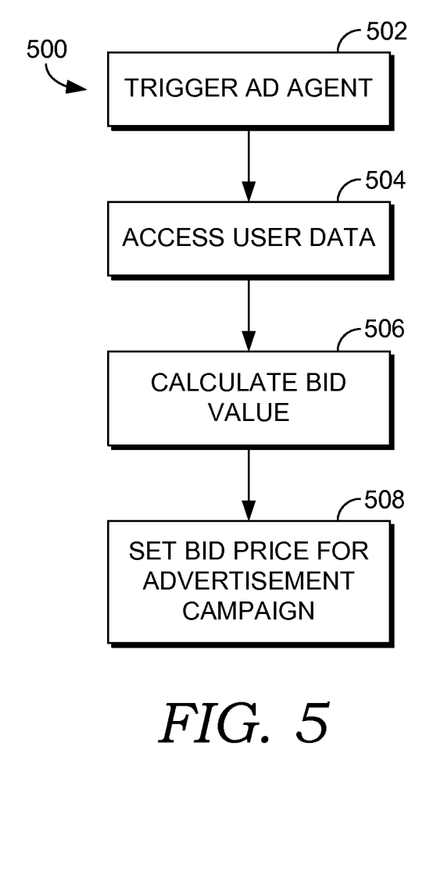
FIG. 5 is a flow diagram showing a method for setting the bid price of an advertisement campaign using a client-based ad agent in accordance with an embodiment of the present invention.

As discussed hereinabove, an advertisement server may support dynamic price tags. Accordingly, the method 400 may include setting the bid price for the advertisement campaign if it is determined that the advertisement campaign should bid on the current impression. In another embodiment, a threshold determination regarding whether the advertisement campaign should bid and a given impression is not made. Instead, a bid value is determined for the current impression and used to set the bid price of the advertisement campaign without a threshold determination. FIG. 5 illustrates a flow diagram of a method 500 for setting the bid price of an advertisement campaign using a client-based ad agent in accordance with an embodiment of the present invention.

As shown at block 502, an ad agent located on an end user's computing device is initially triggered. The ad agent may be triggered, for instance, when a web page is accessed that includes a redirect to an advertisement server or based on the domain of a web page requested by the end user. User data is accessed from the end user's computing device and/or a server device at block 504.

The user data is employed to calculate a bid value for the end user for the current impression, as shown at block 506. The bid value may be calculated based on the user data alone or in conjunction with other information, such as knowledge of aspects of the advertisement campaign or the content/type of the web page in which the advertisement will be presented. Based on the bid value determined at block 506, the ad agent sets the bid price of the advertisement campaign for the current impression, as shown at block 508.

Figure 6:
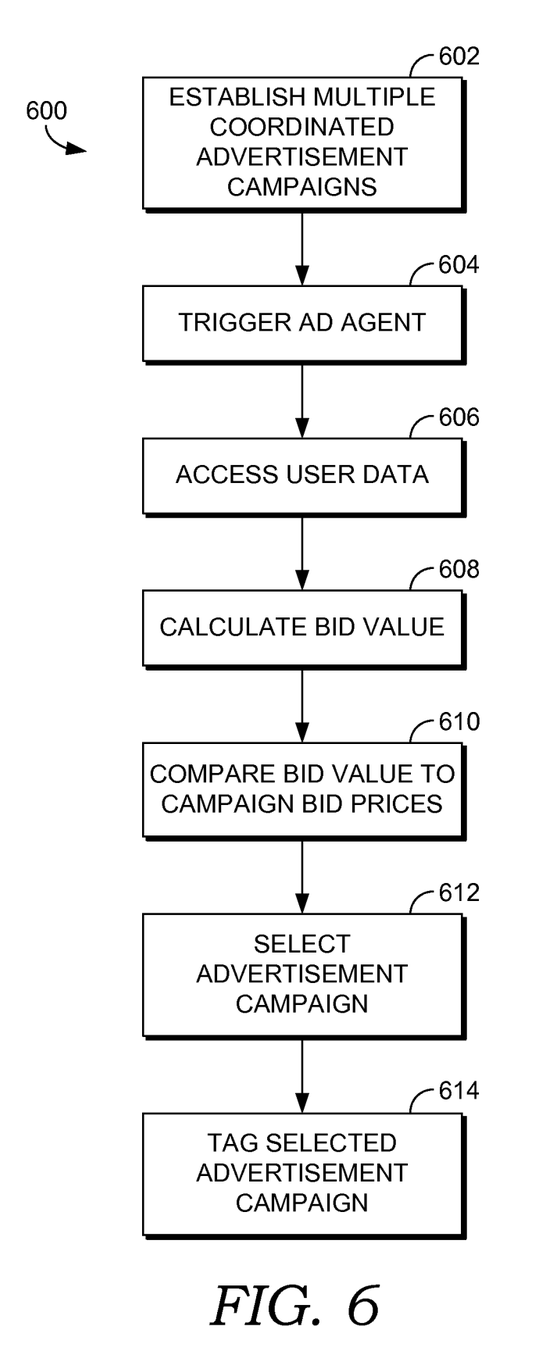
FIG. 6 is a flow diagram showing a method for employing multiple advertisement campaigns to control bid pricing for a given impression in accordance with an embodiment of the present invention.

In some instances, the advertisement server may not support dynamic price tagging for advertisement campaigns. In such instances, multiple coordinated advertisement campaigns may be employed to provide varying bid price levels. Turning now to FIG. 6, a flow diagram is provided that illustrates a method 600 for employing multiple advertisement campaigns to control bid pricing for a given impression in accordance with an embodiment of the present invention. Initially, as shown at block 602, multiple advertisement campaigns are established on an advertisement server. Each advertisement campaign may be associated with a given advertisement but includes a different bid price.

After the advertisement campaigns have been established, an ad agent installed on an end user's computing device is trigged, as shown at block 604. The ad agent may be triggered, for instance, when a web page is accessed that includes a redirect to the advertisement server or based on the domain of a web page requested by the end user. User data is accessed from the end user's computing device and/or a server device at block 606.

The user data is employed to calculate a bid value for the end user for the current impression, as shown at block 608. The bid value may be calculated based on the user data alone or in conjunction with other information, such as knowledge of aspects of the advertisement campaign or the content/type of the web page in which the advertisement will be presented.

In the present embodiment, the ad agent includes knowledge of the bid prices of the multiple advertisement campaigns. The ad agent compares the bid value calculated at block 608 with the bid prices of the advertisement campaigns, at block 610. Based on the comparison, an advertisement campaign is selected at block 612. The ad agent sets a tag on the selected advertisement campaign at block 614 such that the selected advertisement campaign will bid on the current impression while the other advertisements campaigns that were not selected will not bid on the current impression.

Figure 7:
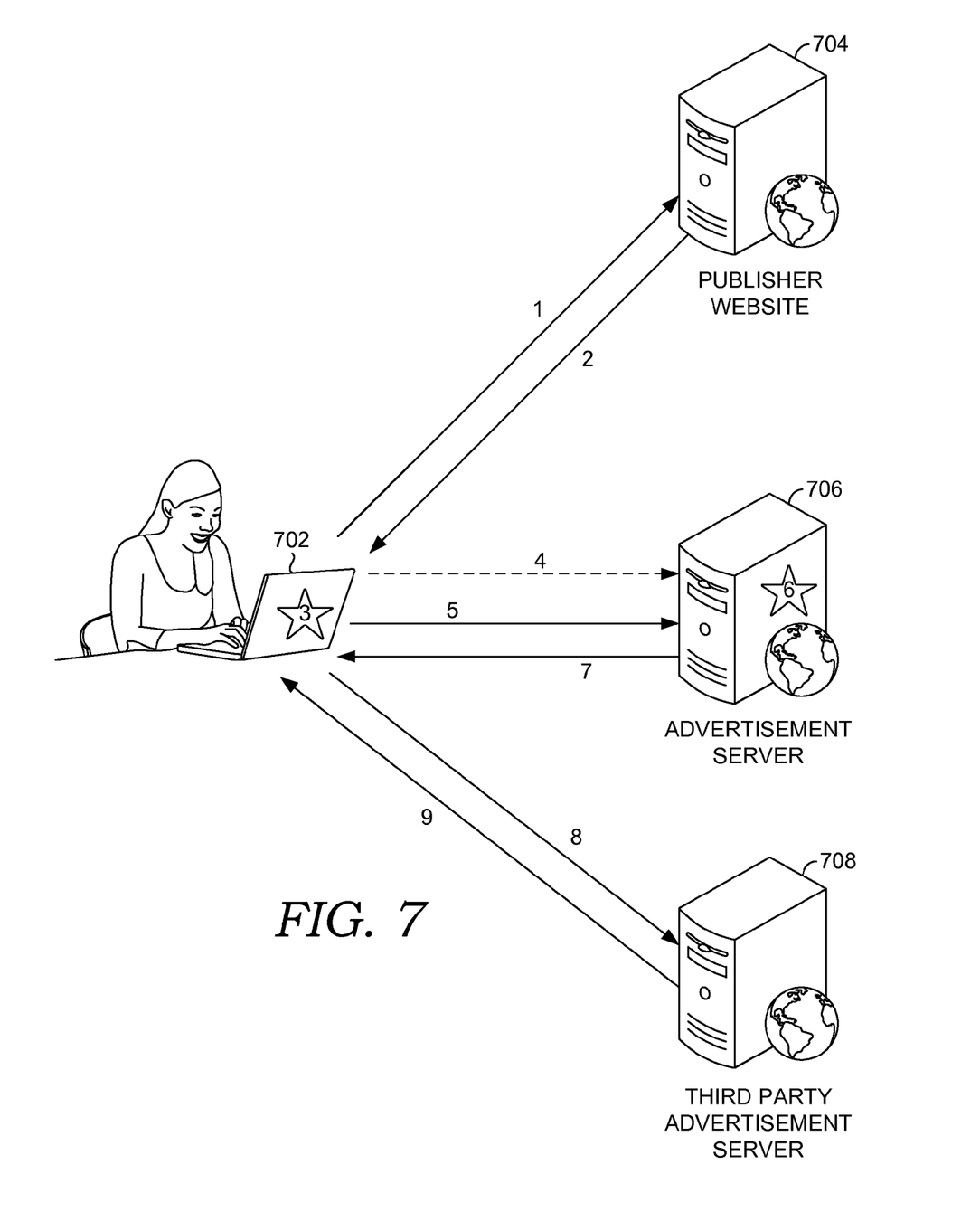
FIG. 7 is a diagram illustrating a process for delivering an advertisement to an end user in accordance with an embodiment of the present invention.

With reference now to FIG. 7, an example of delivering an advertisement to a user device in accordance with one embodiment of the present invention will now be discussed. In the illustrated example, a content server 704 serves web pages from a publisher's website. For instance, the publisher's website served by the content server 704 may be the ABC News website, www.abcnews.com. The ABC News website may include a number of locations for placing advertisements. Placement of advertisements on web pages from the website is directed by the advertisement server 706. For instance, the advertisement server 706 may be an advertisement server maintained by the ABC News service and include advertisement campaigns that the ABC News service has sold directly to advertisers. In the present example, a third party advertising system provider also has established an advertisement campaign on the advertisement server 706. The advertisers' advertisement campaigns and the third party advertising system provider's advertisement campaign may compete for impressions when end users access the website.

The third party advertising system provider has also provided an ad agent for installation on the user's laptop 702 in the present example. The ad agent may comprise, for instance, a web browser add-in component that adds functionality to the web browser on the user's laptop 702. As described in further detail below, the ad agent operates to control whether the third party advertising system provider's advertisement campaign bids on an impression and the bid price for that impression.

As shown in FIG. 7, an end user initially employs a web browser on the user's laptop 702 to access the website from the content server 704. A request is communicated from the laptop 702 to the content server 704 at step 1, and a response that includes a redirect to the advertisement server 706 is received at the laptop 702 at step 2. At step 3, the ad agent on the laptop 702 is triggered based on the presence of the redirect. The ad agent operates to analyze user data for the end user and determines that the third party advertising system provider's advertisement campaign should bid on the current impression. Additionally, the ad agent determines an appropriate bid price for the current impression.

At step 4, the ad agent sets the tag on the third party advertising system provider's advertisement campaign such that the advertisement campaign will bid on the current impression. Additionally, the ad agent sets the bid price for the advertisement campaign. The redirect to the advertisement server 706 is performed at step 5. Although steps 4 and 5 are illustrated as separate steps in the present example, in some embodiments, the redirect to the advertisement server 706 may set the tag and bid price on the advertisement server.

An auction process or other advertisement selection process is performed for the current impression by the advertisement server 706 at step 6. The third party advertising system provider's advertisement campaign competes in the auction using the bid price set by the ad agent and wins the auction. Accordingly, a redirect to the third party advertisement server 708 is returned to the user's laptop 702 at step 7. The redirect to the third party advertisement server 708 is performed at step 8, and an advertisement from the third party advertisement server 708 is delivered to the user's laptop 702 for presentation within the web page accessed from the publisher's website at step 9.

As can be understood, embodiments of the present invention provide a client-based ad agent that facilitates dynamically controlling whether an advertisement campaign bids on an impression for an end user and/or dynamically sets the bid price for the advertisement campaign for the impression based on the value of the end user to the advertisement campaign.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media devices storing computer-useable instructions that, when used by a computing device, cause the computing device to perform a method comprising:

identifying, at a client device, an opportunity for an advertisement impression on the client device;

accessing, at the client device, user data associated with an end user;

analyzing, at the client device, the user data to determine whether to instruct an advertisement campaign to bid on the advertisement impression;

determining, at the client device, to instruct the advertisement campaign to bid on the advertisement impression based on the user data; and communicating, from the client device to an advertisement server, an instruction for the advertisement campaign to bid on the advertisement impression, the instruction controlling the advertisement campaign to bid on the advertisement impression during an advertisement selection process conducted by the advertisement server to select an advertisement for the advertisement impression in which a plurality of other advertisement campaigns also bid on the advertisement impression.

2. The one or more computer storage media devices of claim 1, wherein the opportunity for the advertisement impression is identified by identifying a redirect to an advertisement server within a web page accessed by the client device.

3. The one or more computer storage media devices of claim 1, wherein the opportunity for the advertisement impression is identified based on a domain of a web page requested by the client device.

4. The one or more computer storage media devices of claim 1, wherein the user data is accessed from a user profile stored on the client device.

5. The one or more computer storage media devices of claim 1, wherein the user data is accessed from a user profile stored on a server device.

6. The one or more computer storage media devices of claim 1, wherein the user data comprises at least one selected from the following: information regarding the end user's web browsing history, information regarding the end user's web search history, and information regarding the end user's spending habits.

7. The one or more computer storage media devices of claim 1, wherein analyzing the user data to determine whether to instruct the advertisement campaign to bid on the advertisement impression comprises calculating a score based on the user data and determining whether the score exceeds a predetermined threshold.

8. The one or more computer storage media devices of claim 7, wherein the score comprises a bid value for the end user and the predetermined threshold comprises a bid price associated with the advertisement campaign.

9. The one or more computer storage media devices of claim 1, wherein analyzing the user data to determine whether to instruct the advertisement campaign to bid on the advertisement impression comprises analyzing the user data in conjunction with at least one selected from the following: information regarding the advertisement campaign, and information regarding a web page providing the opportunity for the advertisement impression.

10. The one or more computer storage media devices of claim of claim 1, wherein communicating the instruction for the advertisement campaign to bid on the advertisement impression comprises firing code that sends an http request to the advertisement server.

11. The one or more computer storage media devices of claim of claim 1, wherein the method further comprises determining a bid value for the end user for the advertisement impression and setting a bid price on the advertisement campaign corresponding with the bid value.

12. The one or more computer storage media devices of claim 1, wherein the advertisement campaign is associated with a third party advertising system provider.

13. One or more computer storage media devices storing a client-based ad agent, the ad agent including a plurality of components comprising:

a user data accessing component that accesses user data associated with an end user in response to identifying an opportunity for an advertisement impression on a client device;

a bid decision component that determines a bid value for the end user for the advertisement impression based on the user data; and a tagging component that communicates to an advertisement server an instruction to set a bid price for an advertisement campaign to bid for the advertisement impression corresponding with the bid value, the instruction controlling the advertisement campaign to bid for the advertisement impression using the bid price corresponding with the bid value during an advertisement selection process conducted by the advertisement server to select an advertisement for the advertisement impression in which a plurality of other advertisement campaigns also bid on the advertisement impression.

14. The one or more computer storage media devices of claim 13, wherein the user data accessing component accesses the user data from a user profile stored on a server device.

15. The one or more computer storage media devices of claim 13, wherein the bid decision component determines the bid value for the end user based on the user data in conjunction with at least one selected from the following: information regarding the advertisement campaign, and information regarding a web page providing the opportunity for the advertisement impression.

16. The one or more computer storage media devices of claim 13, wherein the advertisement campaign is associated with a third party advertising system provider.

17. One or more computer storage media devices storing computer-useable instructions that, when used by a computing device, cause the computing device to perform a method comprising:

identifying, at a client device, an opportunity for an advertisement impression on the client device;

accessing, at the client device, user data associated with an end user;

calculating, at the client device, a bid value for the end user for the advertisement impression based on the user data;

comparing, at the client device, the bid value to bid prices associated with a plurality of coordinated advertisement campaigns, each coordinated advertisement campaign having a different fixed bid price;

selecting, at the client device, from the plurality of coordinated advertisement campaigns, an advertisement campaign based on the bid value and a bid price associated with the advertisement campaign; and communicating, from the client device, an instruction for the advertisement campaign to bid on the advertisement impression, the instruction controlling the advertisement campaign to bid on the advertisement impression during an advertisement selection process conducted by the advertisement server to select an advertisement for the advertisement impression in which a plurality of other advertisement campaigns also bid on the advertisement impression.

18. The one or more computer storage media devices of claim 17, wherein the opportunity for the advertisement impression is identified by at least one of the following: identifying a redirect to an advertisement server within a web page accessed by the client device; and identifying the opportunity based on a domain of a web page requested by the client device.

19. The one or more computer storage media devices of claim 17, wherein the bid value for the end user is calculated based on the user data in conjunction with at least one selected from the following: information regarding the plurality of advertisement campaigns, and information regarding a web page providing the opportunity for the advertisement impression.

20. The one or more computer storage media devices of claim 17, wherein the plurality of advertisement campaigns are associated with a third party advertising system provider.

* * * * *